United States Patent
Kaski et al.

(10) Patent No.: US 8,599,220 B2
(45) Date of Patent: Dec. 3, 2013

(54) POSITION FINE TUNING IN A COMPUTER AIDED MODELING

(75) Inventors: Tuomas Kaski, Helsinki (FI); Vesa Tuomiaro, Helsinki (FI)

(73) Assignee: Tekla Corporation, Espoo (FI)

( * ) Notice: Subject to any disclaimer, the term of this patent is extended or adjusted under 35 U.S.C. 154(b) by 978 days.

(21) Appl. No.: 12/609,709

(22) Filed: Oct. 30, 2009

(65) Prior Publication Data

US 2011/0102463 A1 May 5, 2011

(51) Int. Cl.
*G09G 5/00* (2006.01)

(52) U.S. Cl.
USPC .............. 345/649; 345/473; 345/672

(58) Field of Classification Search
USPC .......................... 345/473, 649, 672
See application file for complete search history.

(56) References Cited

U.S. PATENT DOCUMENTS

| | | | | |
|---|---|---|---|---|
| 2004/0001110 A1* | 1/2004 | Khan | | 345/848 |
| 2008/0062126 A1* | 3/2008 | Algreatly | | 345/157 |
| 2008/0150940 A1* | 6/2008 | Oyama et al. | | 345/420 |
| 2008/0238916 A1* | 10/2008 | Ghosh et al. | | 345/419 |
| 2009/0002391 A1* | 1/2009 | Williamson et al. | | 345/619 |
| 2009/0079731 A1 | 3/2009 | Fitzmaurice et al. | | |
| 2009/0079732 A1 | 3/2009 | Fitzmaurice et al. | | |
| 2009/0079739 A1 | 3/2009 | Fitzmaurice et al. | | |
| 2009/0079740 A1 | 3/2009 | Fitzmaurice et al. | | |
| 2009/0083626 A1 | 3/2009 | Fitzmaurice et al. | | |
| 2009/0083628 A1 | 3/2009 | Fitzmaurice et al. | | |
| 2009/0083645 A1 | 3/2009 | Fitzmaurice et al. | | |
| 2009/0083662 A1 | 3/2009 | Fitzmaurice et al. | | |
| 2009/0083666 A1 | 3/2009 | Fitzmaurice et al. | | |
| 2009/0083669 A1 | 3/2009 | Fitzmaurice et al. | | |
| 2009/0083671 A1 | 3/2009 | Fitzmaurice et al. | | |
| 2009/0083672 A1 | 3/2009 | Fitzmaurice et al. | | |
| 2009/0083673 A1 | 3/2009 | Fitzmaurice et al. | | |
| 2009/0083678 A1 | 3/2009 | Fitzmaurice et al. | | |
| 2009/0085911 A1 | 4/2009 | Fitzmaurice et al. | | |

* cited by examiner

*Primary Examiner* — Maurice L McDowell, Jr.
(74) *Attorney, Agent, or Firm* — Young & Thompson (57) ABSTRACT

A position fine tuning of an object without movement of creation points of the object is facilitated with a position tool having a graphic position tool displayed on a display. The graphic position tool may comprise a rotation tool, dragging of which causes the object to rotate accordingly around its creation axis, and/or an offset tool, either a clickable one or a draggable one, with which the object's position on an offset plane can be changed. A clickable offset tool may comprise buttons clicking of which causes the object to move a predetermined offset value(s) to a direction defined by the button.

21 Claims, 7 Drawing Sheets

POSITION FINE TUNING IN A COMPUTER AIDED MODELING

FIELD

The invention relates to computer-aided modeling and particularly to a position fine tuning of an earlier created object in the model.

BACKGROUND

Modeling means that a model is created from an object under design for describing the object to be manufactured. The development of data processing systems and computers has transformed modeling into a computerized process facilitating modeling complicated objects, such as buildings, which may consist of large numbers of different parts. For example, a model of a building is created by creating different parts and often copying them to different places so that an overall model of the building is received rather fast. When more detailed information for drawings, for example, is needed, a position fine tuning of a modeled part (called an object) may be needed.

SUMMARY

The invention relates to methods, program products and apparatuses which are characterized by what is stated in the independent claims. The preferred embodiments are disclosed in the dependent claims.

An aspect provides an apparatus with a position tool comprising a graphic user interface which facilitates position fine tuning of an object. The position tool may comprise a rotation tool and/or an offset tool to change a position of an object according to user input.

An aspect provides a position tool which changes a position of an object in a model without changing the position of creation point(s) of the object.

BRIEF DESCRIPTION OF THE DRAWINGS

In the following different embodiments will be described in greater detail with reference to the attached drawings, in which.

DETAILED DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any computer-aided model-based modeling system. These systems typically apply predefined elements that are provided with values in connection with the modeling. Examples of these elements include different parts, such as beams, columns, plates, different connections, and different details. The invention is particularly suitable for entity-based modeling systems in which the physical properties of an object are expressed as attributes, i.e. by using parameters. In other words, a modeled object is given its creation point or points, such as a starting point and ending point of the object, the amount of creation points depending on the object to be modeled, and values for different parameters representing the objects physical values. This way the object is not tied to the physical properties of the part it depicts, but the geometry of the object can be created, when needed, by using the parameters. For example, a beam may be modeled in an entity-based modeling system by defining its starting point and ending point and providing values for different parameters representing the beams physical properties. The parameters of a beam, for example, may include location, material, type of cross-section and size. The parameters may even indicate the type of the object, which in the beam example is a beam. The invention may also be implemented in outline-based modeling systems, in which a modeled object consists of edges and the form and size of the object are essential elements of the modeled object. In an outline-based modeling system a beam, for example, is modeled by drawing each side of the beam and then combining the sides to form the beam, the profile of the beam being then modified by moving a necessary number of beam sides away from their original location.

Figure 1:
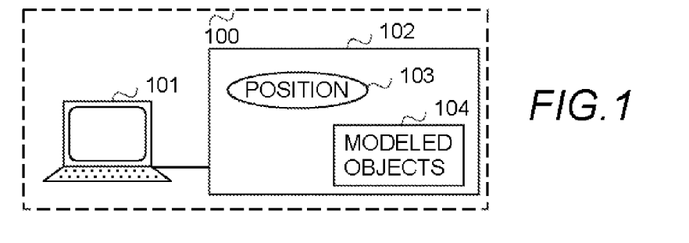
FIG. 1 is a simplified block diagram illustrating the architecture of a system used as an example.

FIG. 1 illustrates a simplified modeling system describing only some units with their operative connections, the implementation of which may deviate from what is presented. It is obvious to a person skilled in the art that the system may also comprise other functions and structures that need not be described in greater detail here. Further, details of the disclosed structures and apparatuses that are not disclosed below, are irrelevant to the invention, and therefore they are not described in detail here.

The modeling system 100 illustrated in FIG. 1 comprises a personal computer with a user interface 101, and a computing apparatus 102 comprising a position fine tuning unit 103 and memory 104.

The user interface 101 is the interface of the user, i.e. the person processing the model, to the modeling system. The user can create a model, modify a model, study it, perform position fine tuning of one or more objects in the model, print desired drawings and reports of the model, view the drawings beforehand, input information to the model, etc. by the means of the user interface 101.

The position fine tuning unit 103, implementable by the modeling sys-tem 100, and having a graphic position tool displayable by means of the user interface 101, is configured to perform functionalities of a position tool that will be disclosed below in more detail. The position fine tuning unit 103 may be configured to perform functions from different disclosed embodiments to facilitate the position fine tuning.

The memory 104 comprises, for example, data relating to the model and stored/to be stored during modeling, such as information on modeled objects and/or information relating to the position fine tuning. In the exemplary system, data are stored in the memory in a file, for instance, and during processing the data constitute a "run-time database" in the central memory where they are read from a disk memory and where they can be processed faster. When the processing ends, the run-time data of the database, or at least the modified data, are stored in the disk memory. It is obvious to a person skilled in the art that data can be stored in one or more files and/or they can be stored/processed in another form and/or by using other memories. Further, instead of, or in addition to the above described disk memory, an object-oriented database or a relation database, for example, can be utilized and used over a network from one or more terminals, for instance. Various programming techniques, storage of data in memory and manners of implementing databases develop constantly. This may require extra changes in the invention. Consequently, all terms and expressions should be interpreted broadly, and they are intended to describe, not to restrict, the invention.

The modeling system 100 illustrated in FIG. 1 represents the simplest modeling system. In larger modeling systems, the user interface may be a terminal and the memory a database with which the terminal communicates via a server. The server performs functions of the position fine tuning unit of the exemplary system, or at least some of them, allowing also the terminal to carry out functions of the position fine tuning unit of the exemplary system. There may be one or several networks between the terminal and the server. They may comprise several terminals and servers with databases, which are preferably integrated, to be visible to the modeler as one database and one database server. Whether the functions to be described below are performed in a computing apparatus, in a terminal, in a database server or so that some of them are performed in a terminal and some in a database server, i.e. the location where the position fine tuning is performed, is irrelevant to the invention.

Figure 2:
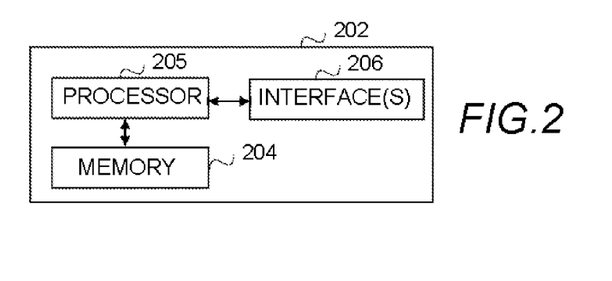
FIG. 2 is a schematic block diagram of an exemplary apparatus.

FIG. 2 depicts some structural elements of a computing apparatus 202 configured to implement a position fine tuning unit according to an embodiment. Apparatuses, such as personal computers and/or other corresponding devices or apparatuses implementing the functionality of a position fine tuning unit described with an embodiment, comprise not only prior art means, but also means for providing and/or performing position fine tuning, for example. More precisely, they comprise means for implementing functionality described with an embodiment and they may comprise separate means for each separate function, or means may be configured to perform two or more functions, and even to combine functions of different embodiments. For example, a graphic tool of an embodiment may be combined with a functions disclosed with another graphic tool, and vice versa.

The apparatus 202 may be configured as a computer or a microprocessor, such as single-chip computer element, including at least a memory 204 for providing storage area used for arithmetic operation, a processor 205, controller, control unit, micro-controller, operation processor, or the like connected to the memory and configured to execute the arithmetic operation, and user interface software with corresponding user interface input/output 206 circuitry (circuitries) connected to the processor and configured to receive user inputs and to output the outcome of the arithmetic operation to a display, the arithmetic operation being executed in response to a user input, as will be described below in more detail.

Present apparatuses comprise processors and memory that can be utilized in an embodiment. The memory may be volatile and/or non-volatile memory and the memory may be, for example, random access memory, a hard drive, or other fixed data memory or storage device. Further, the memory, or part of it, may be removable memory detachably connected to the apparatus. The user input interface may comprise any number of apparatuses allowing a user to input data, select various forms of data and navigate menus or sub-menu's or the like. In this regard, the user input interface includes but is not limited to a joystick(s), keypad, a button(s), a soft key(s) or other input device(s) used with one or more displays. Further, the user output interface may comprise any number of apparatuses, such as displays, allowing data to be outputted to the user.

Depending on an implementation, the position fine tuning unit may be, for example, a software application, or a software module, or a software unit, or a software update configured as an arithmetic operation, or as a program (including an added or updated software routine), executed by an operation processor, such as a central processing unit, or an additional operation processor. An embodiment provides a computer program embodied on any user-terminal-readable distribution/data storage medium, comprising program instructions which, when loaded into an apparatus, constitute the position fine tuning unit. Programs, also called program products, including software routines, program snippets constituting "program libraries", applets and macros, can be stored in any medium, and may be downloaded into an apparatus.

Alternatively, or in addition to the above, the position fine tuning unit may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments.

Although the computing apparatus has been depicted as one unity, different processors, controllers, interfaces and/or memory may be implemented in one or more physical or logical units.

It should be appreciated that the apparatuses may comprise other units used in or for the position fine tuning, and other modeling. However, they are irrelevant to the actual invention and, therefore, they need not to be discussed in more detail here.

Figure 3:
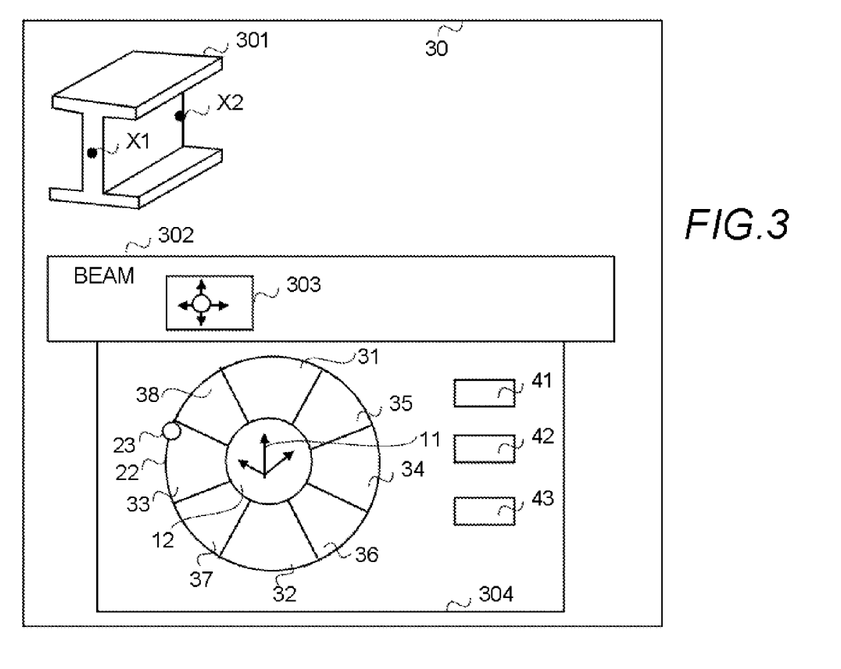
FIG. 3 shows a display with an exemplary graphic position tool.

FIG. 3 illustrates an example what can be seen on a display 30 according to an embodiment. In the example, it is assumed that a user has selected an object 301 from the model causing a mini toolbar 302 to appear on the display, and then the user has selected a position button 303 thereby starting the position fine tuning (i.e. the position tool which may also be called as a position control). In this example the object 301 is a beam, and its creation points are denoted with X, the creation points being a starting point X1 of the beam and an ending point X2 of the beam (other characteristics of the beam are given as parameters). Further, in the illustrated example, it is assumed that the object is in its original position, and in the illustrated implementation no off-set button is shown as a selected one if the object is in its original position. However, in another implementation, a center button, for example, may be shown as the selected one if the object is in the original position.

In the example, a graphic position tool 304 for beams appears because the position tool was started. The graphic position tool 304 comprises a rotation ring 22 (or a rotation circle) with a rotation knob 23. The ring and the knob form a rotation tool (also called a rotation wheel). For movement to different directions on an offset plane, the graphic position tool 304 further comprises a center button 12 to center the object and, between the center button and the rotating ring, eight other offset buttons: a button 31 to move the object up, a button 32 to move the object down, a button 33 to move the object left, a button 34 to move the object right, a button 35 to move the object north-east, a button 36 to move the object south-east, a button 37 to move the object south-west, and a button 38 to move the object north-west. The above mentioned movement directions means directions in the position tool, i.e. according to a point of object's local compass. For example, south-east means between the down and right. The nine buttons form an offset tool in the illustrated example. The offset tool in the embodiment may also be called as an offset wheel and the combination of the offset wheel and the rotation wheel may be called a position wheel. In another embodiment, the center button forms a restore tool restoring the original position and the offset buttons forms the offset tool. The graphic position tool 304 further comprises a local three dimensional coordinates 11, i.e. local coordinate axis, of the beam to facilitate the conceptualization of the objects local "directions".

The rotation tool rotates the object around its creation axis, i.e. axis formed by the starting point X1 and the ending point X2 as much as the rotation knob is dragged. Clicking a button causes the object to move on the offset plane which is perpendicular to the creation axis and intersects the creation axis in the starting point X1. The position tool may be configured so that a polybeam (or any "polyobject"), i.e. a beam having at least three creation points (including creation points that are both an ending point and a starting point), will have, when the amount of creation points is m, m−1 creation axis around which the polybeam rotates and m−1 offset planes. The position tool may also be configured so that the first creation axis is the one around which the object rotates and/or there is one offset plane which is the plane defined by the first creation axis and the first starting point. (The first starting point is the starting point that is not also an ending point.)

In the illustrated example the position tool comprises also a field tool having three different fields for user input: a field 41 for a rotation angle, a field 42 for left-right movement on the offset plane and a field 43 for up-down movement on the offset plane. In other words, the field 42 may be used to give a local x-axis value and the field 43 may be used to give a local y-axis value, if the creation axis is interpreted to be the local z-axis directed towards the ending point.

In an implementation, the directions in the position tool, including the rotation direction, are defined in relation to a direction from the starting point to the ending point regardless of the viewing angle, so that, for example, north-east means north-east in the direction defined from the starting point to the ending point, and if the user is viewing the object from the opposite direction, the movement will be shown as southwest movement. In the embodiment, the local coordinate axis performs as a compass, and thereby facilitates the user to figure out what the directions actually are.

In an alternative implementation, the position tool is configured to adapt to the viewing direction. For example, the position tool may be configured to determine the direction to be from the starting point to the ending point, when the starting point is closer than the ending point to the viewing point, and vice versa. The advantage of the embodiment is that the different directions of the position tool are more logical to use.

The appearance of the graphic position tool is not restricted in any way, as the different examples illustrated in FIGS. 4A to 4H depict. Further, depending on a selected object, the appearance of a position tool 404 may be different, or some of the options in the tool may not be usable (and preferably indicated so, by, for example, changing the color and/or borders of a corresponding option). In FIGS. 4A-4H similar reference numerals refer to similar features, and corresponding reference numerals as in FIG. 3 has been used for corresponding rotation and offset tools. In the illustrated examples no field tool is depicted but it may be included in each illustrated graphic position tool (as well as a missing, if missing, center button and/or local coordinates).

Figure 4A:
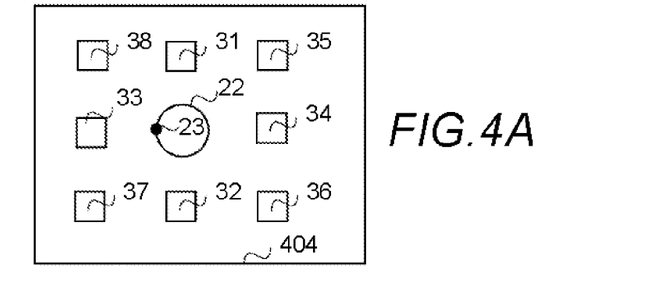
FIGS. 4A-4H illustrate examples of graphic position tools.
Figure 4B:
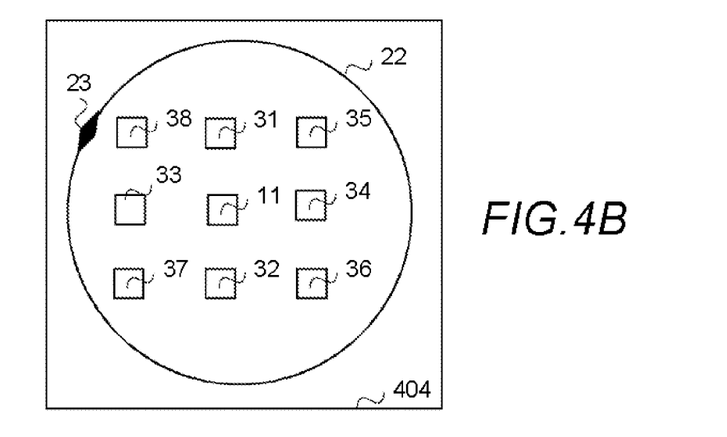
Figure 4C:
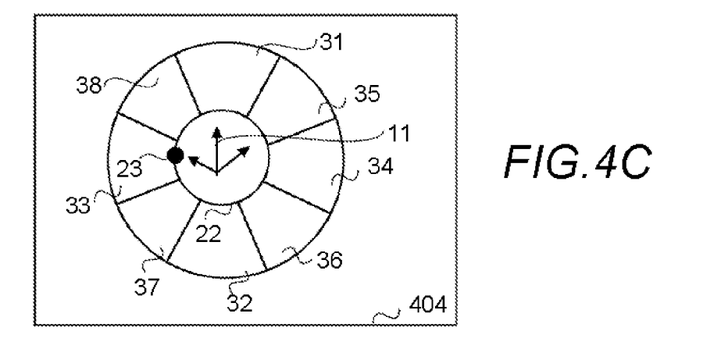
Figure 4D:
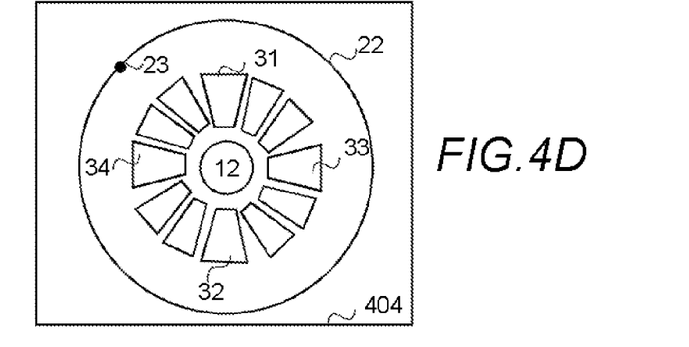
Figure 4E:
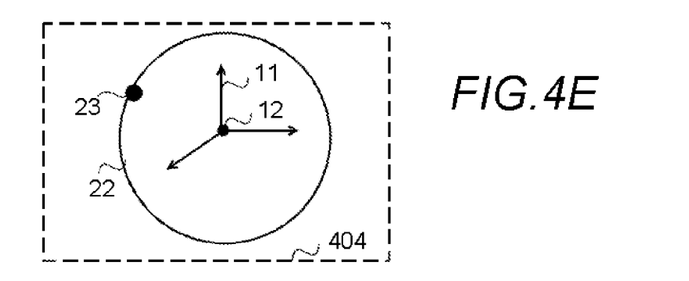
Figure 4F:
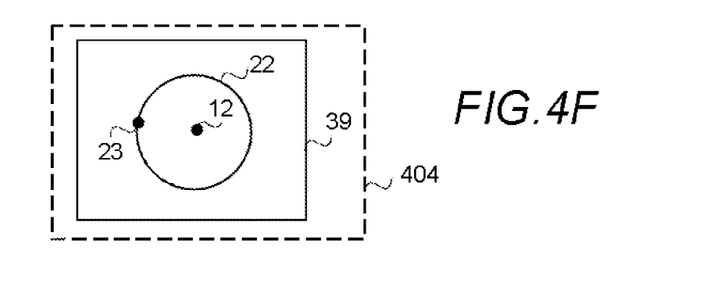
Figure 4G:
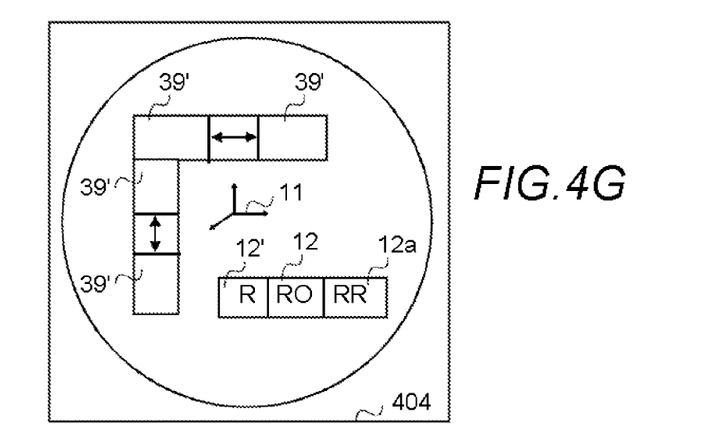

The graphic position tool may be without the center button and/or local coordinates, as the examples illustrated in FIGS. 4A, 4B, 4C, 4E. The center button may be replaced by a restore tool, as illustrated in FIG. 4G, having a restore offset button 12, a restore rotation button 12a and a restore both the offset and the rotation button 12'. The rotation tool may be inside the offset tool, as illustrated in FIGS. 4A, 4C. Further, the rotation wheel may be integrated to, or overlapping with, the offset wheel, as illustrated in FIGS. 3 and 4C, or the diameter of the rotation ring may a bigger than the diameter of the outer ring of the offset wheel as illustrated in FIG. 4D. The buttons may be of different shape and/or size (even within one graphic position tool) and they need not to form a wheel, as illustrated in FIGS. 4A, 4B, 4G and 4H. Further, the center button may not be adjacent to the other buttons in the offset tool and/or the other buttons may not be adjacent to each other in a graphic position tool, as is illustrated in FIGS. 4A. 4B, 4D. In addition, the amount of buttons may vary, as is clear from FIGS. 4D, 4G and 4H, for example. The center button may also be the mid-point (origin) of the local coordinates, as illustrated in FIG. 4E. The offset tool may be implemented without buttons, as is illustrated in FIGS. 4E and 4F, wherein the offset area may be within the rotation ring, possible confined by the rotation ring, or indicated as a separate area 39 or the offset area may be whole working area of the graphic user interface. In yet another example, when the position tool is active and running, the object itself may be the offset area. Further, the offset tool may be a combination of buttons and the offset area 39', as illustrated in FIG. 4G. For example, dragging a cursor or a button within the offset area, or within a button-specific offset area, will cause the object to move correspondingly on its offset plane.

Figure 4H:
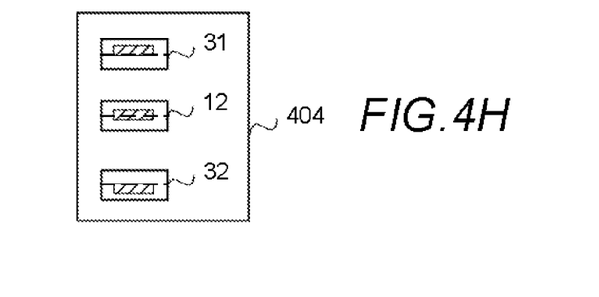

It should be appreciated that different position tools may comprise only one or two of the above mentioned rotation tool, offset tool and field tool, as is illustrated in FIG. 4H, and a position tool may comprise some further tools not disclosed herein. For example, the position tool may comprise a circle-like tool, possibly rotating with the object, to further aid the user in a position fine tuning of an object. Further, a position tool may comprise a rotation tool of one embodiment disclosed herein and an offset tool of another embodiment disclosed herein, and it may implement either one of the above disclosed implementations relating to the directions.

Each example of the position tool described herein may be a sub-tool of a control tool (like the mini toolbar in FIG. 3), or it may be a separate control tool.

Figure 5:
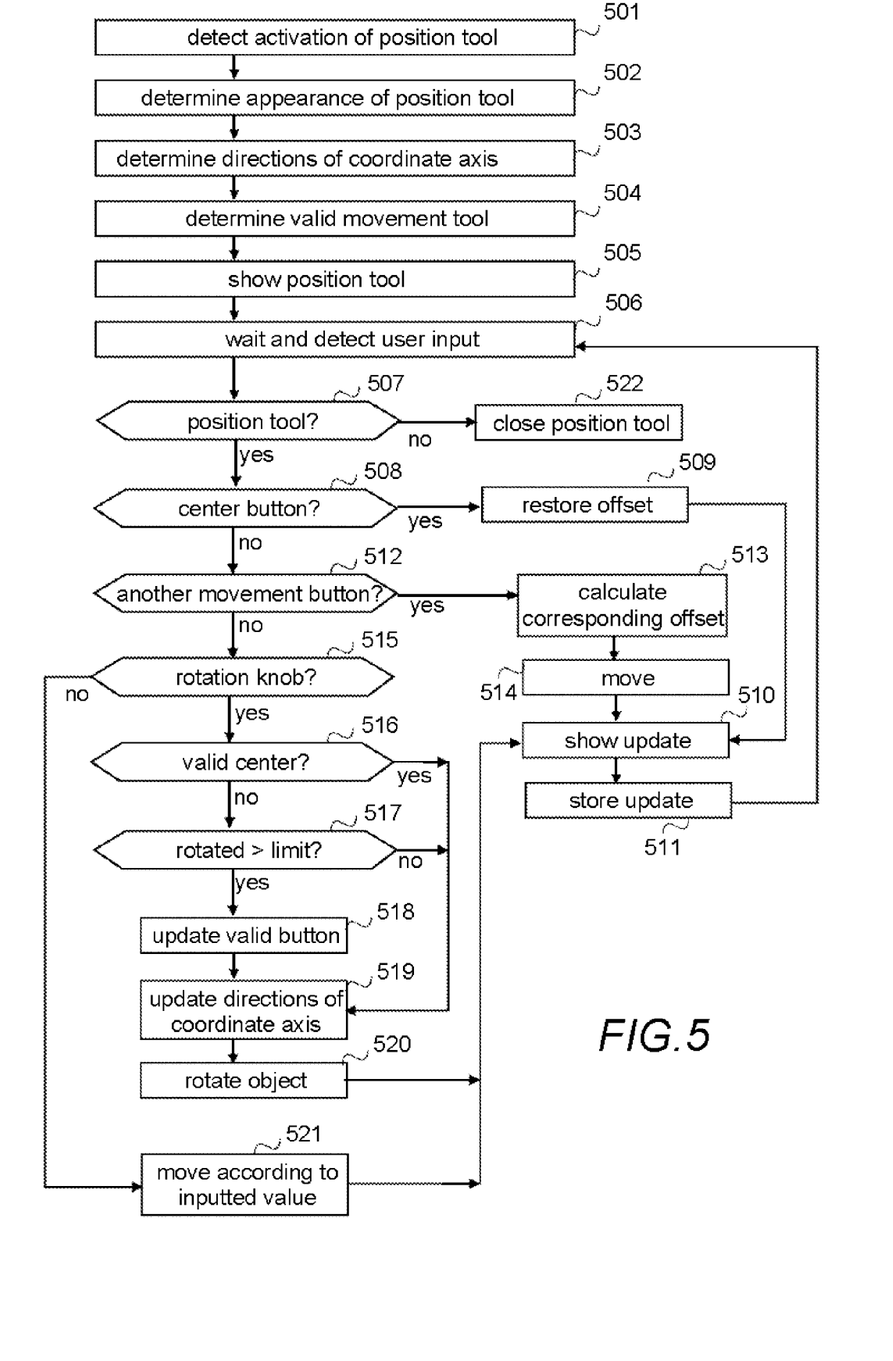
FIG. 5 is a flow chart illustrating position fine tuning according to an embodiment.

FIG. 5 is a flow chart illustrating functionality of an apparatus configured to implement a position tool (a position fine tuning unit) according to an embodiment, the different position alternatives of which are illustrated in FIGS. 6A-6K, the position alternatives of an object 301 being illustrated in respect to the creation axis denoted by X in FIGS. 6A-6K. The offset alternatives illustrated in FIGS. 6A-6K are the most commonly used in the modeling, and the advantage of providing them as assumed offsets is that there is no need to the user to presume the amount of offset needed to move the object from the middle of the creation axis (which is most often overlapping with a grid used to aid in modeling) so that one of the object's sides is, instead of the center of the object, overlapping with the creation axis/grid. Depending on an implementation, the creation point(s) are shown or not shown to the user, and a grid used in modeling may or may not be used to a user. The use of the assumed offsets facilitates position fine tuning, minimizes errors in the modeling and reduces the use of processing resources because "try a value and notice that it was not the right one" may cause many move actions to be performed before the proper position on the offset plane is achieved. In other words, the presentation of most commonly used position fine tuning offsets by the means of buttons on a display enables users to perform their task more efficiently.

In the process of FIG. 5, it is assumed that an object has been selected, and the user has activated (step 501) the position tool by clicking a corresponding icon. Therefore the position tool determines, in step 502, a proper appearance of the graphic position tool based on the selected object. For example, if the object is a beam or a column, a graphic position tool illustrated in FIG. 3 may be selected, but if the object is a slab, for example, a graphic position tool illustrated in FIG. 4H may be selected allowing only the user to select among the up, down and center buttons. The directions of the local coordinate axis are calculated, in step 503, and a valid offset tool is determined in step 504. In the embodiment it is assumed that one and only one of the offset buttons, including the center button, is shown as selected all the time. If no position fine tuning has taken place before, the valid button is the center button. Otherwise it is the last used offset button (the offset buttons include the center button in the embodiment). When the characteristics of the graphic position tool for this specific object has been determined, the graphic position tool is shown (step 505) to the user via the display. Then, after a while or immediately after showing the graphic position tool, a user input is detected (step 506).

Figure 6A:
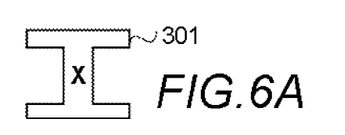
FIGS. 6A-6K illustrate examples of position changes.
Figure 6B:
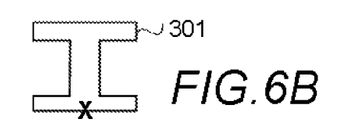
Figure 6C:
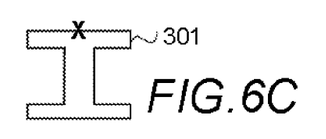
Figure 6D:
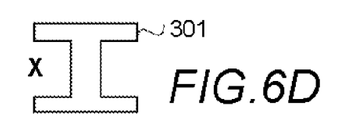
Figure 6E:
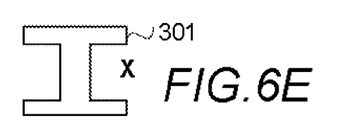
Figure 6F:
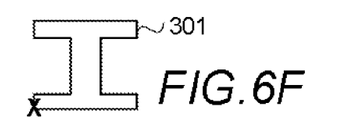
Figure 6G:
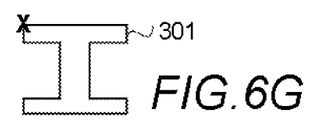
Figure 6H:
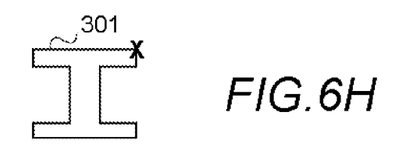
Figure 6I:
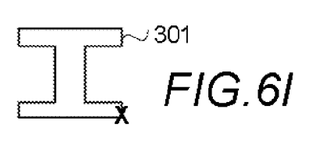
Figure 6J:
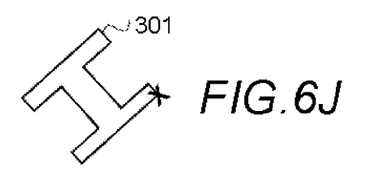
Figure 6K:
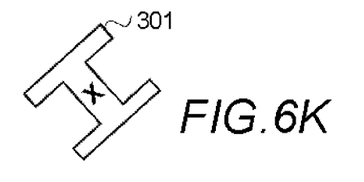

If the user input is within the graphic position tool (step 507), it is determined to what in the graphic position tool the user input relates. If the center button was clicked (step 508), the object's position on the offset plane is restored in step 509 to the original position on the offset plane as illustrated in FIG. 6A (when the object has not been rotated using the position tool) and 6K (when the object has been rotated using the position tool). The object in the updated position is shown, in step 510, to the user via the display, and the updated position information (possibly including information on the last used button), or changes to position information, are stored in step 511. Then another user input is waited for and the process moves back to step 506.

If another offset button than the center button was selected (step 512), a corresponding offset is calculated in step 513, and the object is moved according to the calculations in step 514. For example, in an embodiment, clicking the up-button causes the object move up as illustrated in FIG. 6B. Correspondingly, clicking the down-button causes the object to move down as illustrated in FIG. 6C. Clicking the right-button causes the object to move right as illustrated in FIG. 6D. Clicking the left-button causes the object to move left as illustrated in FIG. 6E. Clicking the north-east button causes the object to move as illustrated in FIG. 6F. Clicking the south-east button causes the object to move as illustrated in FIG. 6G. Clicking the south-west button causes the object to move as illustrated in FIG. 6H, and clicking the north-west button causes the object to move as illustrated in FIG. 6I. The updated position is shown, in step 510, to the user via the display, and the updated position information, including the offset value and information on the last used button, is stored, in step 511, and the process continues to step 506 to wait for another user input.

In another embodiment of the invention, the corresponding movement is added to a previous movement so that clicking the up-button twice will cause the object to move twice its height upwards. In the embodiments, accumulated offsets are preferably used. Alternatively to the offsets illustrated in FIGS. 6A-6K, offset buttons may have a common predetermined value, such as 5 mm, or each offset button has its specific predetermined value, with which the object is moved to the direction specified by the button.

If the user input was dragging the rotation knob (step 515), it is checked, in step 516, if the valid offset tool is the center button. If no, then it is checked, in step 517, whether or not the rotation from the original position is more (i.e. accumulated tracked dragging is more) than a limit. In the example, the rotation is more than the limit, if the change to the angle is at least 45°. If yes, then the valid button in the graphic position tool shown for the user is updated, in step 518 by hopping in the example over one button at a time (in an animation way) so that the outcome at the end of using the rotation tool is as follows: when change in the angle is from 45° up to but not included 135°, one button is hopped over, when change in the angle is from 135° up to but not included 225°, three buttons are hopped over, when change in the angle is from 225° up to but not included 315°, five buttons are hopped over, and when the change in the angle is between 315° and up to but not included 45°, the update ends to the button it started. However, if for example the up-button is the valid button, it remains as a valid button, although it may look like the left-button to the user (because of the rotation the offset plane rotates as well). It should be appreciated that any other limit, such as 22.5° and/or type of hopping and/or updating, for example hopping button by button, or no hopping at all, may be used. The advantage of implementing the hopping is that with it the offset wheel is a more logical tool to a user. The directions of local coordinate axis are updated, in step 519, and the object is rotated, in step 520, around its creation axis as much as the rotation knob was dragged. Then the updated position, and the updated local coordination axis, are shown, in step 510, to the user via the display, and the updated position information, including the offset value, is stored, in step 511, and the process continues to step 506 to wait for another user input. FIG. 6J shows an example of an updated position when rotation knob is dragged after clicking the north-west button.

If the valid offset button is the center button (step 516), or rotation angle is less than the limit, the process continues from the step (step 519) were the directions of the local coordinate axis are updated.

If the user input was a value given in the field tool (i.e. the center or another offset tool was not clicked and the rotation knob was not dragged), the object is positioned according to the given value or values in step 521, and the process continues in step 510 were the update is shown to user. Depending on the implementation, the field values may be added to previous offset/rotation updates, or the position fine tuning with the field values is always performed from the original position. An advantage of providing the possibility to use the field tools with buttons having assumed or default values is that in special cases the user is able to move, for example, the object more or less than in "standard" cases.

If the user input was not for the position tool (step 507), the position tool is closed in step 522.

As is apparent from the above, the creation points remain in their original position, only offset values (including the rotation angle) are changed and updated.

Although given as separate steps, the position tool is preferably arranged to display the outcome of the position fine tuning immediately in response to a user performing the position fine tuning by using one of the tools provided in the graphic position tool. An advantage is that the process is simplified because no specific action to show the outcome is required from the user. A further advantage of the position fine tuning being displayed as an animation to the user is that there will be less mistakes in the model, since the user immediately sees the outcome and it is more illustrative to the user. This in turn means that less processing resources are needed. Further, less time is needed and the position fine tuning is much easier to the user, i.e. the user may perform the position fine tuning more efficiently.

When drawings, for example, are prepared, the dimensions are calculated using the creation points, parameter values, and the stored offset values (including rotation angle's and possible values given via the field tool).

In another embodiment, the center button restores the original position, and clicking a valid button restores the original position on the offset plane (and then no button is shown as a valid one). If the implementation includes showing the rotation knob as selected, when the object has been rotated using the rotation ring, clicking the rotation knob would restore the original angle. Alternatively, if the rotation knob is not shown as a selected one, double clicking the rotation knob would restore the original angle.

Figure 7:
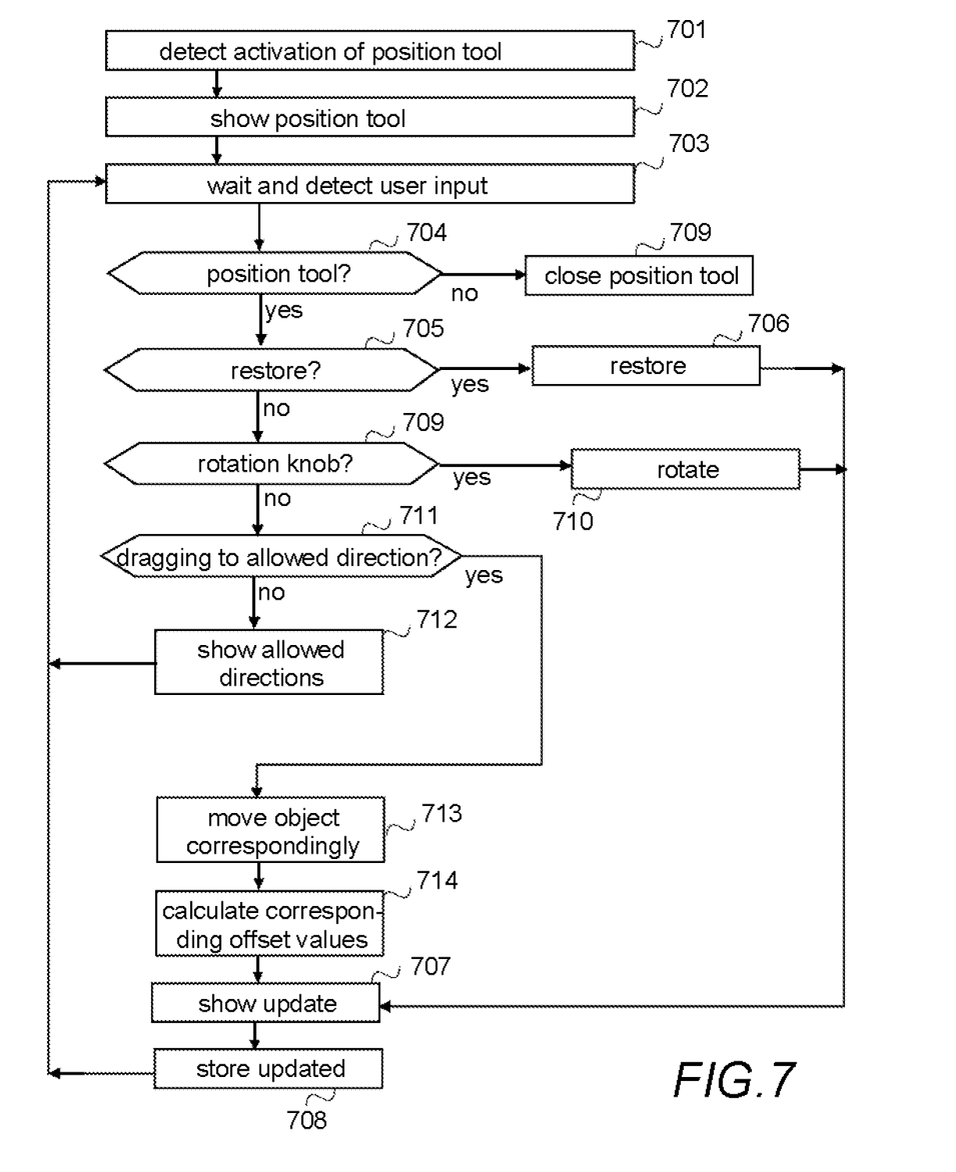
FIG. 7 is a flow chart illustrating position fine tuning according to an embodiment.

FIG. 7 is a flow chart illustrating functionality according to another embodiment. In the embodiment the graphic position tool comprises the position ring with the position knob, an offset area and a separate "restore" button.

In the process of FIG. 7 it is assumed that an object has been selected, the user has activated (step 701) the position tool by clicking a corresponding icon, and the position tool is shown (step 702) to the user via the display. Then, after a while or immediately after showing the position tool, a user input is detected (step 703).

If the user input is within the position tool (step 704), it is determined to what in the position tool the user input relates. If the restore button was clicked (step 705), the object's position is restored in step 706 to the original position. The object in the restored position, i.e. in an updated position, is shown, in step 707, to the user via the display, and the updated position information, or changes to position information, are stored in step 708. Then another user input is waited for and the process moves back to step 703.

If the user input was dragging the rotation knob (step 709), the object is rotated, in step 710, around its creation axis as much as the rotation knob was dragged. Then the updated position is shown, in step 707, to the user via the display, and the updated position information is stored, in step 708, and the process continues to step 703 to wait for another user input.

If the restore button was not clicked and the rotation knob not dragged, the user has dragged a cursor within the offset area. Then it is checked, in step 711, whether the dragging was for a proper direction for the object in question.

If not, the allowed directions, preferably with a text describing them as allowed directions, is shown, in step 712 to the user via the display. Then the process continues to step 703 to wait for another user input is detected. If the direction was an allowed one (step 711), the object is moved, in step 713, correspondingly to the dragged direction and length (i.e. the dragging is tracked). Then a corresponding offset is calculated in step 714 taking into account the viewing scale. The updated position, and in the example illustrated in FIG. 8, also the offset values are shown, in step 707, to the user via the display, and the up-dated position information, including the offset value (or offset values), is stored, in step 707, and the process continues to step 703 to wait for another user input.

If the user input was not for the position tool (step 704), the position tool is closed in step 709.

An advantage that one click or one dragging causes the object to move and the movement is shown substantially immediately after the user input is received which then results to advantages discussed above.

Figure 8:
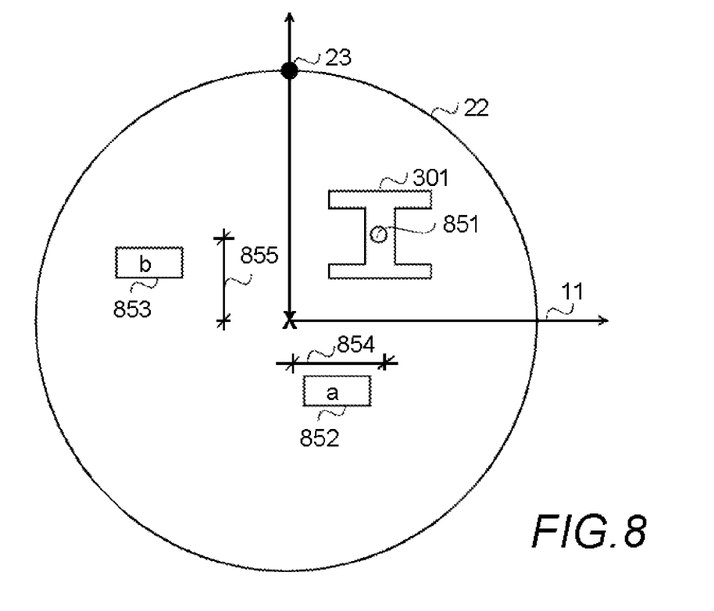
FIG. 8 illustrates an example of what may be displayed on a display after a position fine tuning.

FIG. 8 illustrate an example graphics displayed on a display in a situation in which an object 301 has been dragged on the offset plane, as described above with FIG. 7, for example. The creation axis of the object 301 is denoted with X in FIG. 8, and in the illustrated example, the local coordinate axis 11 intersect the creation point. Since the selected object is a beam, the rotation ring 22 with a rotation knob 23 is shown to the user. In the implementation, the offset is illustrated by giving the offset values 852 and 853 describing how much the object was moved calculated from the creation axis (point) to a point 851 to which the creation axis (point) would have been moved if it had been moved with the object. The offset values are in the implementation further clarified by showing also corresponding offset dimension lines 854 and 855. In some other implementation no offset values and/or no offset dimension lines are shown to a user.

In another implementation the rotation ring with the rotation knob is moved with the object.

Although not illustrated in FIG. 8, a grid used in the model is preferably also shown to facilitate the position fine tuning of an object selected from the model, so that the user may for example put the cursor on the top surface of the beam and drag it to the next grid, thereby directly positioning the beam to a proper place. This makes the position tool to a user-friendly tool having advantages discussed above.

Figure 9:
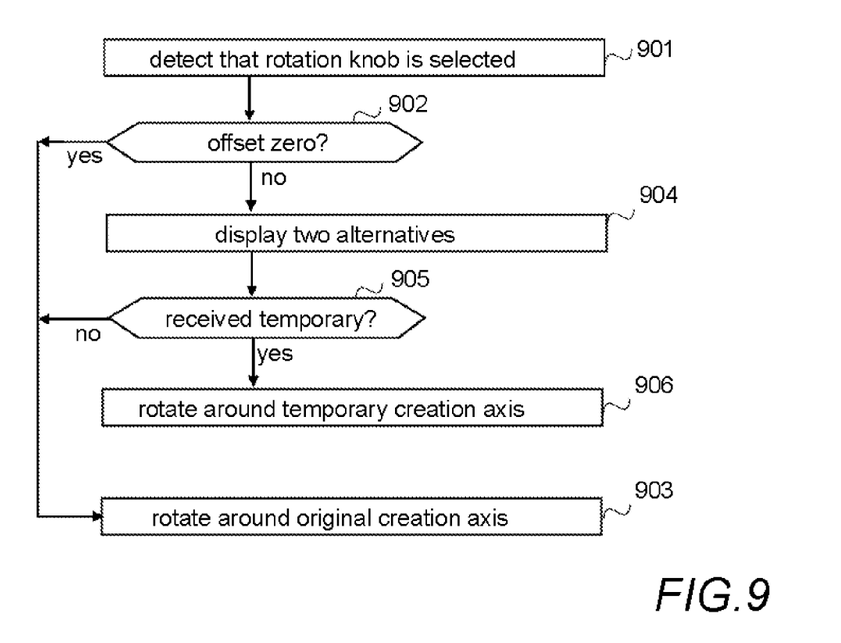
FIG. 9 is a flow chart illustrating an additional implementation to a rotation tool.

FIG. 9 is illustrates an additional implementation to a rotation tool which may be combined with each illustrated FIG. 9 starts in a situation in which an object has been selected, a position tool activated, and some position fine tuning may have been performed.

In FIG. 9, when it is detected, in step 901, that a rotation knob has been selected, it is checked, in step 902, whether or not an offset is zero. In other words, it is checked, whether or not the object is in its original location on the object's offset plane, in which case the creation axis may be called an original creation axis.

If the object is in its original location, the offset is zero, and the object is rotated in step 903 around its (original) creation axis, as described above.

If the offset is not zero, the position tool displays, in step 904, two alternatives to the user for the user to select: whether the rotation should be around the original creation axis, or around a temporary creation axis, which is an axis corresponding to the original creation axis but being moved accordingly to the offset performed to the object on the offset plane. For example in the embodiment illustrated in FIG. 8, the temporary creation axis goes through the point 851.

If a user selection received in step 905 is "temporary", the object is rotated, in step 906, around the temporary creation axis, otherwise the object is rotated (step 903) around its (original) creation axis.

In a further embodiment, if the offset is not zero, the object is always rotated around the temporary creation axis, and the above described steps 904 and 905 are omitted.

The temporary creation axis can be interpreted as a fictitious axis or as the object's own axis.

The steps and related functions described above in FIGS. 5, 7 and 9 are in no absolute chronological order, and some of the steps may be performed simultaneously or in an order differing from the given one. For example, the position fine tuning is preferably displayed as an animation when dragging occurs and not only after the dragging ends. Another example is that in the embodiment illustrated in FIG. 7, calculating step 714 and moving step 713 may be performed simultaneously, or the calculating step first. Other functions can also be executed between the steps or within the steps. For example, in response to detecting the activation of the position tool, a menu will be displayed, and the user may select which one or one(s) of the rotation tool, offset tool and the field tool, the user wants to use, and the user's selection is used in determining what is displayed as a graphic position tool. The graphic position tool may comprise a separate tool enabling change of the selected tool. Some of the steps or part of the steps can also be left out. For example, showing the offset values, as illustrated with FIG. 8, may be omitted, as well as the steps disclosed with FIG. 5 that relate to updating the valid button during rotation (i.e. steps 516-518). Further, some of the steps or part of the steps can also be integrated together or replaced by a corresponding step or part of the step. For example, instead of detecting that a rotation knob is dragged, it may be detected that the rotation ring has been dragged.

Although the embodiments have been illustrated assuming that only one object is selected, two or more objects may be selected to be a group to which the position fine tuning is performed. In an implementation, each object's position fine tuning is performed using the object's own creation axis and offset plane when the position fine tuning is performed to the group in response to a user input.

Although in the above it is assumed that a button is selected by clicking it, other means, such as button-specific key combinations, to select a button may be used.

In each of the illustrated embodiments and examples, it depends on the implementation when a position change (offset and/or rotation) is stored to be part of the actual model information (such as the information in the run-time database). For example, the position change may be stored as temporary information during dragging and only after the dragging is stopped, the position change is stored to the actual model information (i.e. a direct manipulation is used). However, it may be that also during dragging every sub-change is stored to the actual model information. Further, it may be that all position changes are stored as temporary information as long as the position tool is activated, and only during the closing of the position tool position fine tuning information is stored to be part of the actual model information.

It will be obvious to a person skilled in the art that, as the technology advances, the inventive concept can be implemented in various ways. The invention and its embodiments are not limited to the examples described above but may vary within the scope of the claims.

What is claimed is:

1. A computerized method comprising:
    displaying on a display two or more objects belonging to a model, each object having one or more creation points that define object's position in the model;
    selecting at least one object amongst the two or more objects displayed;
    receiving an input activating a position fine tuning of the selected at least one object; and
    displaying a graphic position tool on the display, the graphic position tool comprising at least a rotation tool, the dragging of which causes the selected at least one object to rotate around its creation axis, and an offset tool comprising buttons displayed to a user, wherein a selection of a button causes the selected at least one object to move on an offset plane of the selected at least one object according to the movement defined for the selected button without moving non-selected objects and the one or more creation points of the selected at least one object, the movement of the selected at least one object causing a position update in the position of the selected at least one object in the model.

2. The computerized method of claim 1, further comprising:
    detecting an input within the graphic position tool;
    displaying the position update of the selected at least one object according to the input as an animation; and
    storing updated position information.

3. The computerized method of claim 2, wherein when the input is a selection of a button and the updated position information comprises at least an updated offset value.

4. The computerized method of claim 1, further comprising:
    showing always one of the buttons as a selected button.

5. The computerized method of claim 4, further comprising:
    updating, in response to the input being dragging the rotation tool, the button which is shown to a user as the selected button to correspond the rotation without updating offset values.

6. The computerized method of claim 1, further comprising:
    determining directions used in the position fine tuning from a starting creation point to an ending creation point of the object.

7. The computerized method of claim 1, further comprising:
    determining a first distance which is a distance from a viewing point to a starting creation point of the selected at least one object;
    determining a second distance which is a distance from the viewing point to an ending creation point of the selected at least one object;
    comparing the first distance with the second distance; and
    if the second distance is longer than the first distance, directions used in the position fine tuning are determined from the ending creation point to the starting creation point; and
    if the second distance is not longer than the first distance, directions used in the position fine tuning are determined from the starting creation point to the ending creation point.

8. The computerized method of claim 1, wherein the graphic position tool further comprises a field tool comprising at least one field to which a numeric value may be given as an input.

9. The computerized method of claim 8, further comprising:
    displaying the rotation tool as a combination of a rotation ring and a rotation knob for dragging; and
    using nine buttons as the offset tool providing offsets to the following directions: center, up, down, left, right, north-east, south-east, south-west, and north-west.

10. The computerized method of claim 9, further comprising displaying the offset tool in a form of a wheel having one button in a center of the wheel and the other eight buttons disposed around the one button.

11. The computerized method of claim 1, further comprising displaying local coordinate axis of the selected at least one object on the graphic position tool.

12. The computerized method of claim 1, wherein the creation axis is a temporary creation axis, which is the original creation axis moved accordingly to the offset performed to the selected at least one object on the offset plane.

13. A computerized method comprising:
displaying on a display two or more objects belonging to a model, each object having one or more creation points that define object's position in the model;
selecting at least one object amongst the two or more objects;
receiving an input activating a position fine tuning of the at least one selected object;
selecting a graphic position tool among at least two different graphic positions tools based on a type of the selected object, wherein a first graphic position tool comprises at least a rotation tool to rotate the selected at least one selected object and a first offset tool to move the selected at least one object on an offset plane of the object without moving the one or more creation points of the selected at least one object, and a second graphic position tool comprises a second offset tool providing more limited offset directions than the first offset tool; and
displaying the selected graphic position tool on the display, wherein the movement of the selected at least one object causes a position update in the position of the selected at least one object in the model.

14. The computerized method of claim 13, further comprising:
detecting an input within the graphic position tool;
displaying a position update of the selected at least one object according to the input as an animation; and
storing updated position information.

15. A computerized method comprising:
displaying on a display two or more objects belonging to a model, each object having one or more creation points that define object's position in the model;
selecting at least one object amongst the two or more objects displayed;
receiving an input activating a position fine tuning of the selected at least one object; and
displaying a graphic position tool on the display, the graphic position tool comprising at least a rotation tool, a dragging of which causes the selected at least one object to rotate around its creation axis, and an offset tool a dragging within which causes the selected at least one object to move according to the dragging without moving the selected at least one object's creation points and non-selected objects,
wherein the movement of the selected at least one object causes a position update in the position of the selected at least one object in the model.

16. The computerized method of claim 15, further comprising:
detecting an input within the graphic position tool;
displaying a position update of the selected at least one object according to the input as an animation; and
storing updated position information.

17. An apparatus comprising:
at least one processor;
at least a display; and
at least one memory including computer program code;
the at least one memory and the computer program code configured to, with the at least one processor, cause the apparatus at least to display on the display two or more objects belonging to a model, each object having one or more creation points that define object's position in the model, and a graphic position tool, to detect that at least one of the two or more objects is selected and, in response to a dragging within the position tool, to move the selected at least one object accordingly without moving its creation points and non-selected objects.

18. An apparatus comprising:
at least one processor;
at least a display; and
at least one memory including computer program code,
the at least one memory and the computer program code configured to, with the at least one processor, cause the apparatus at least
to display on the display two or more objects belonging to a model, each object having one or more creation points that define object's position in the model, and a graphic position tool with which user input may be received to position fine tuning of selected object amongst the two or more objects, the graphic position tool comprising at least a rotation tool and an offset tool,
in response to a user input being using the rotation tool, to rotate the selected object around its creation axis correspondingly; and
in response to a user input being using the offset tool, to move the selected object on its offset plane correspondingly without moving its one or more creation points and non-selected objects.

19. The apparatus of claim 18, wherein the at least one memory and the computer program code are further configured to, with the at least one processor, cause the apparatus to display a position update of the selected object as an animation.

20. A computer program product embodied on a non-transitory data storage medium and comprising program instructions executable by a processor such that, when executing said instructions, an apparatus comprising the processor will,
in response to an activation of a position tool, to display a graphic position tool on a display, the graphic position tool comprising at least a rotation tool, and an offset tool comprising buttons,
in response receiving a user input via the rotation tool after a user input indicating that at least one object amongst two or more objects is selected, to rotate the selected at least one object around its creation axis correspondingly, and to display the rotation as animation; and
in response to receiving a user input on the offset tool after the user input indicating that at least one object amongst two or more objects is selected, to move the selected at least one object on its offset plane correspondingly without moving non-selected objects and the selected at least one object's one or more creation points defining an original position of the selected at least one object's in a model, and to display the movement to the new position in the model as an animation.

21. A computer program product embodied on a non-transitory data storage medium having and comprising computer-readable instructions executable by a processor such that, when executing said instructions, an apparatus comprising the processor will, in response to activation of a position tool, to display a graphic position tool on a display, and, in response to receiving a user input via the graphic position tool after at least one object amongst two or more objects has been selected, each object having one or more creation points defining a position of the object in a model, to update the position of the selected at least one object correspondingly in the model and to display the update of the position in the model as an animation.

* * * * *